US007860861B2

(12) United States Patent
Okuda et al.

(10) Patent No.: US 7,860,861 B2
(45) Date of Patent: Dec. 28, 2010

(54) INFORMATION PROCESSING APPARATUS, INFORMATION PROCESSING METHOD, AND PROGRAM FOR THE SAME

(75) Inventors: Hiroshi Okuda, Tokyo (JP); Hidetoshi Ichioka, Tokyo (JP); Hitoshi Kimura, Kanagawa (JP); Kensuke Ohnuma, Tokyo (JP)

(73) Assignee: Sony Corporation (JP)

( * ) Notice: Subject to any disclaimer, the term of this patent is extended or adjusted under 35 U.S.C. 154(b) by 356 days.

(21) Appl. No.: 11/200,799

(22) Filed: Aug. 10, 2005

(65) Prior Publication Data
US 2006/0036589 A1    Feb. 16, 2006

(30) Foreign Application Priority Data
Aug. 13, 2004    (JP)    ............... P2004-235923

(51) Int. Cl.
G06F 7/00    (2006.01)
G06F 17/30    (2006.01)
(52) U.S. Cl. ............. 707/736; 707/737; 707/740; 707/748; 707/752
(58) Field of Classification Search ......... 707/999.102, 707/736, 737, 740, 748, 752
See application file for complete search history.

(56) References Cited

U.S. PATENT DOCUMENTS

| 5,890,164 | A * | 3/1999 | Nielsen ................. 707/201 |
| 5,987,457 | A * | 11/1999 | Ballard ..................... 1/1 |
| 6,185,614 | B1 * | 2/2001 | Cuomo et al. ............ 709/224 |
| 6,415,294 | B1 * | 7/2002 | Niemi .................... 707/102 |
| 6,473,128 | B1 * | 10/2002 | Berger ................... 348/461 |
| 6,581,207 | B1 * | 6/2003 | Sumita et al. ............ 725/46 |
| 6,910,071 | B2 * | 6/2005 | Quintero et al. .......... 709/224 |
| 7,010,515 | B2 * | 3/2006 | Nakano ................... 707/1 |
| 7,031,982 | B2 * | 4/2006 | Tanigawa et al. ....... 707/104.1 |
| 7,158,983 | B2 * | 1/2007 | Willse et al. ........... 707/101 |
| 2002/0072895 | A1 * | 6/2002 | Imanaka et al. ........... 704/9 |
| 2002/0143932 | A1 * | 10/2002 | Quintero et al. ........ 709/224 |

(Continued)

FOREIGN PATENT DOCUMENTS

JP    10-042234 A    2/1998

(Continued)

OTHER PUBLICATIONS

Office Action from Japanese Application No. 2004-235923, dated Jul. 6, 2010.

*Primary Examiner*—Tim T. Vo
*Assistant Examiner*—Jay A Morrison
(74) *Attorney, Agent, or Firm*—Lerner, David, Littenberg, Krumholz & Mentlik, LLP

(57) ABSTRACT

An apparatus and method enable easy extraction of popular programs from program information. A keyword extracting section extracts keywords from program information received by a program information receiving section. A keyword counting section counts a number of keywords for one week among the extracted keywords to obtain a keyword count for that week. A difference value computing section computes a difference value between the keyword count for the current week and the keyword count for the past week. A popular keywords extracting section extracts a predetermined number of keywords in a descending order of difference values each indicating a difference between the keyword count for the current week keywords and the keyword count for the past week keywords, and sets the keywords as those for the current week.

14 Claims, 14 Drawing Sheets

U.S. PATENT DOCUMENTS

| | | | |
|---|---|---|---|
| 2002/0174271 A1* | 11/2002 | Tanigawa et al. | 710/11 |
| 2002/0194166 A1* | 12/2002 | Fowler | 707/3 |
| 2003/0023972 A1* | 1/2003 | Gutta et al. | 725/34 |
| 2003/0220913 A1* | 11/2003 | Doganata et al. | 707/3 |
| 2003/0221198 A1* | 11/2003 | Sloo | 725/136 |
| 2004/0059736 A1* | 3/2004 | Willse et al. | 707/100 |
| 2005/0160295 A1* | 7/2005 | Sumi | 713/201 |

FOREIGN PATENT DOCUMENTS

| | | | |
|---|---|---|---|
| JP | 10-042235 A | 2/1998 |
| JP | 10-042236 A | 2/1998 |
| JP | 2002215647 A | 8/2002 |
| JP | 2003-006195 A | 1/2003 |
| JP | 2004-080194 A | 3/2004 |
| JP | 2004-185220 A | 7/2004 |
| JP | 2004-193943 A | 7/2004 |
| JP | 2004206517 A | 7/2004 |

* cited by examiner

KAMIJO ATOMU
KAGA MAIKO
KATO AKI
KAGAWA MIDORI
KAMOGAWA SAKURA
NATSUNO RIMI
NATSUMOTO MARI
HUYUKI YUTAKA
UTAZAWA SHICHIEMON
KAWARA CHOJURO
KONO TAKASHI
HINO REIKO
HANASAWA MARI
NOHARA YASUYO
KAJIWARA HIKARU
KATSURAGI YUMI
KAMOSHITA FUSAE
MIZUKI RISA
TATEYAMA HIROSHI
IWAMOTO HIROMI

METER
MEMBER
DRAMA
ANIMATION
SPORTS
MOVIE
NEWS
VARIETY
VARIETIES
INTERVIEW
QUIZ
INTRODUCTION ONCE FOR ALL
POSSIBILITY

FIG. 5

| KEYWORD | NUMBER OF KEYWORD |
|---|---|
| IRAQ | 3 |
| MARATHON | 13 |
| WENTZ EIJI | 1 |
| UNIQUE | 1 |
| PUB | 1 |
| FUJITA TATSUYA | 1 |
| YAMASHITA KOJI | 1 |
| ISHIGAMI KOJI | 1 |
| KATORI SHOGO | 3 |
| EMOTO YOSUKE | 1 |
| SAKAI MASATO | 1 |
| PART-TIME WORKER | 1 |
| ATHENS | 18 |
| AFRICA | 3 |
| DIGITAL | 1 |
| IWAHARA SATOKO | 6 |
| TASMANIA | 1 |
| METER | 3 |
| TSURUMI MAYUKO | 2 |
| MURATA JUNJI | 1 |
| INUKAI HIROSHI | 1 |
| YAMASHITA YOKO | 1 |
| SHAKU YUKAKO | 1 |
| INTERVIEW | 2 |
| SPORTS | 50 |
| SEASONAL METEOROLOGICAL TOPICS | 4 |
| ASIA | 8 |
| WORLD | 4 |
| COLUMN | 5 |
| MIYAKE TAMIO | 4 |
| MORNING | 4 |
| KANAGAWA | 2 |
| TALK | 6 |
| KANTO DISTRICT | 4 |
| UCHIDA KATSUNORI | 4 |
| ISHIHARA ASAKO | 4 |
| HATANO TOMOYUKI | 4 |
| KUNIMI YUKO | 3 |
| HIMURO TUYOSHI | 1 |
| WADA AIKO | 4 |
| YOUNG AND OLD | 1 |
| POSSIBILITY | 3 |
| IMAI TAMAKO | 4 |
| MORIKAWA MIYUKI | 4 |
| ARIMOTO YUMI | 4 |
| FAMOUS PEOPLE | 2 |
| OSADA KAZUSHIGE | 3 |
| ⋮ | ⋮ |

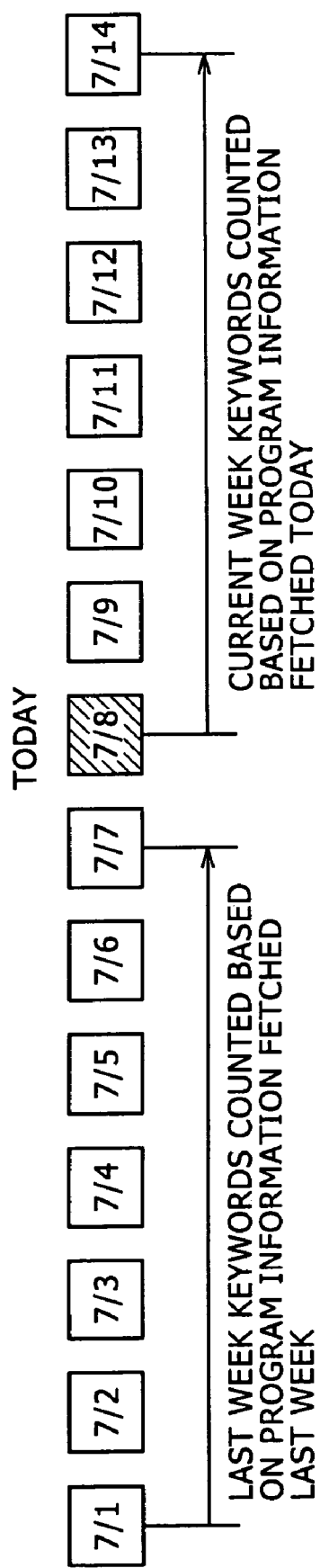

FIG.7

| KEYWORD | NUMBER OF CURRENT WEEK KEYWORDS | NUMBER OF LAST WEEK KEYWORDS | LAST WEEK TO CURRENT WEEK |
|---|---|---|---|
| ATHENS | 18 | 4 | 14 |
| MARATHON | 13 | 2 | 11 |
| TOM-TOM | 10 | 0 | 10 |
| FRONT SIDE | 6 | 0 | 6 |
| TAKANO NAOKO | 6 | 0 | 6 |
| SPECIAL | 6 | 1 | 5 |
| MIZUMOTO MAKI | 6 | 1 | 5 |
| TOJO HIDEKI | 5 | 0 | 5 |
| SOCCER | 8 | 4 | 4 |
| YOUNG STAR | 6 | 2 | 4 |
| EPISODE | 6 | 2 | 4 |
| SPOT | 6 | 2 | 4 |
| BEEF STEW | 5 | 1 | 4 |
| SUMMARIZED VERSION | 5 | 1 | 4 |
| ORIGINAL | 4 | 0 | 4 |
| DOME | 4 | 0 | 4 |
| REMAKE | 4 | 0 | 4 |
| SAWADA YASUKO | 4 | 0 | 4 |
| ASIA | 8 | 5 | 3 |
| PET | 5 | 2 | 3 |
| LIVE | 5 | 2 | 3 |
| ENTERTAINMENT INDUSTRY | 5 | 2 | 3 |
| NAKATA MIHOKO | 5 | 2 | 3 |
| ZOOM EYE | 4 | 1 | 3 |
| RESTAURANT | 4 | 1 | 3 |
| CROQUETTE | 3 | 0 | 3 |
| SOCCER/ATHENS | 3 | 0 | 3 |
| CERGIO ECHIZEN | 3 | 0 | 3 |
| TV STARS | 3 | 0 | 3 |
| CHALLENGE | 3 | 0 | 3 |
| DUKE SARASHINA | 3 | 0 | 3 |
| BAHRAIN | 3 | 0 | 3 |
| MESSAGE | 3 | 0 | 3 |
| TEMPORAL DISCHARGE FROM HOSPITAL | 3 | 0 | 3 |
| THYROID GLAND | 3 | 0 | 3 |
| FINAL ELIMINATION MATCH | 3 | 0 | 3 |
| SHI HUANGDI | 3 | 0 | 3 |
| EVENT | 3 | 0 | 3 |
| INTRODUCTION OF NEW JURYO | 3 | 0 | 3 |
| MIKAWA KENJI | 3 | 0 | 3 |
| MISAKO | 3 | 0 | 3 |
| AMERICA | 8 | 6 | 2 |
| CORNER | 4 | 2 | 2 |
| IMPRESSIVE EPISODE | 4 | 2 | 2 |

FIG. 8

LIST OF POPULAR PROGRAM    7:42 PM, MARCH 24 (WED.)

SEARCH OBJECT TITLE

POPULAR KEYWORDS ON MARCH 24 (WED.), 2004

| POPULAR KEYWORD | RELATED PROGRAM | | | | | |
|---|---|---|---|---|---|---|
| IIYA CHOSUKE | 24 (WED.) / 7:00PM / FAREWELL TO MR. IIYA | | | | | |
| TORIBU | 25 (THU.) 8:00AM IN MEMORY OF MR. IIYA | | | | | |
| ITO KATSUYA | 25 (THU.) 9:40AM 24 (WED.) | | | | | |
| KUDO MOTOGORO | | | | | | |
| RACE IN MEMORIAL OF PRINCE TAKAMATU | | | | | | |

1/3

7:00 PM TO 9:48 PM TV NICHI-NICHI
SPECIAL PROGRAM FOR 40TH ANNIVERSARY OF FORMATION OF "THE TORIBU" TITLE: "FAREWELL TO IIYA CHOSUKE" EXPLOSIVE LAUGHER BY TORIBU AND MITSUKO

10 TV NICHI-NICHI

SELECT WITH ◁▷◁▷   DECIDE AND DECIDE WITH   TERMINATE VIEW WITH

FIG. 9

GOTO KUMI, GOKUMI
GOTO MAKI, GAMAKI
TAKANO NAOKO: Q-CHAN
SHIRASE TETSUKO: TOTTO-CHAN
SATO ERI: SATOERI
SHINAGAWA FUMIE: FUMIN
SAKATA MASAAKI: MACHAAKI
OI NORIKO:NORIPEE
TOKORO JOHN: TOKORO-SAN
OIZUMI KYOKO: KYON-KYON
FUKANO KYOKO: FUKA-KYON
SNAP, KIMURA TAKUTO, KIMU-TAKU, NAKAGAMI MASAHIRO,
KATORI SHOGO, INAGAKI JIRO, KUSANAGI HITOSHI, KUSAnagi HITOSHI
CHONAN, SUNAPPU
SUNAPPU: SNAP
KIMURA TAKUTO, SNAP, KIMUTAKU, SUNAPPU
NAKAGAMI MASAHIRO, SNAP, SUNAPPU
KATORI SHOGO, SNAP, SUNAPPU
INAGAKI JIRO, SNAP,SUNAPPU
KUSANAGI HITOSHI, SNAP, CHONAN, SUNAPPU, KUSAnagi HITOSHI
KUSAnagi HITOSHI, SNAP, CHONAN, SUNAPPU, KUSANAGI HITOSHI

INFORMATION PROCESSING APPARATUS, INFORMATION PROCESSING METHOD, AND PROGRAM FOR THE SAME

CROSS-REFERENCE TO RELATED APPLICATIONS

The present application claims priority from Japanese Patent Application No. JP 2004-235923 filed on Aug. 13, 2004, the disclosure of which is hereby incorporated by reference herein.

BACKGROUND OF THE INVENTION

The present invention relates to an information processing apparatus, an information processing method, and a program for the same, and more particularly, to an information processing apparatus and an information processing method enabling easy extraction of a popular program from program information, and a program for the same.

With the advent of a hard disk recorder used for recording a TV broadcast program, now a user can record (video-tape) a TV program in a large capacity hard disk and enjoy (reproduce) the recorded TV program at a date and time different from those on which the TV program was actually broadcasted and also regardless of the program sequence. Because of the convenience, a user is now apt to record programs regardless of whether the user actually reproduce and enjoy each of the programs, and therefore there is a possibility that, although a large number of programs are recorded in a large capacity hard disk, the program are kept idle among a vast amount of contents and are not actually reproduced.

If a user can focus attention on to a currently popular program and record the program in a hard disk, the opportunity for the user to reproduce and enjoy the program may increase because the program is popular, which makes it possible to reduce the chances that the contents is recorded uselessly.

With this configuration, however, the user is required to search for a currently popular program from information introduced on newspapers or TV information magazines, or from a medium making use of the Internet.

To solve the problem as described above, there has been proposed an invention for enabling extraction of keywords from program information to array the program in the descending order of the number of keywords appearing in each program so that a popular program can be extracted (Refer to, for instance, Japanese Patent Laid-open No. Hei 10-42234, Japanese Patent Laid-open No. Hei 10-42235, Japanese Patent Laid-open No. Hei 10-42236).

Simply with rearrangement of programs in the descending order of the number of keywords, for instance, general words such as "baseball" or "drama" may be extracted as a keyword, and therefore sometimes an actually popular program may be missed.

SUMMARY OF THE INVENTION

The present invention makes it possible to easily extract a popular program from program information.

An information processing apparatus according to the present invention includes acquisition means for acquiring program information for broadcast contents; first extracting means for extracting keywords from the program information; counting means for counting the extracted keywords to obtain a keyword count; preserving means for preserving the keyword count; computing means for computing a difference value between a prior keyword count preserved in the preserving means and a current keyword count; second extracting means for extracting a predetermined keyword from the program information based on the difference value; and searching means for searching program information including the predetermined keyword extracted by the second extracting means.

The information processing apparatus according to the present invention may further include excluding means for excluding a predetermined category of the program information acquired by the acquisition means.

The information processing apparatus according to the present invention may further include excluding means for excluding from the program information acquired by the acquisition means program information for programs having a duration shorter than a predetermined threshold value.

The information processing apparatus according to the present invention may further include storage means for storing excluded keywords; and excluding means for excluding the excluded keywords stored in the storage means from among the keywords extracted by the second extracting means.

The information processing apparatus according to the present invention may further include storage means for storing synonyms of the keywords, wherein the searching means further searches program information stored in the storage means and including synonyms corresponding to the predetermined keyword extracted by the second extracting means.

The information processing apparatus according to the present invention may further include determining means for determining whether the prior keyword count has surpassed a predetermined threshold value, wherein the second extracting means does not extract keywords when it is determined by the determining means that the prior keyword count has surpassed the predetermined threshold value.

The information processing apparatus according to the present invention may further include display control means for controlling the display of the program information searched by the searching means.

The first extracting means may extract the keywords from the program information for a period of one week from a date on which program information is acquired by the acquisition means.

The first extracting means may further extract the keywords from detailed information in the program information.

The first extracting means may extract the keywords from the program information for programs broadcast through a predetermined channel.

The second extracting means may extract keywords for which there is a large difference value.

The second extracting means may extract keywords for which the keyword count shows a substantial increase as compared to the prior keyword count.

The information processing apparatus according to the present invention further includes display control means for controlling a display unit to display a list of the predetermined keywords extracted by the second extracting means.

The display control means may control the display unit to display the program information searched by the searching means together with the list of the predetermined keywords extracted by the second extracting means.

The searching means may search for program information including a keyword selected from the list of predetermined keywords displayed on the display unit; and the display control means may control the display unit to display the program information searched by the searching means together with the list of the predetermined keywords extracted by the second extracting means.

A method for searching broadcast contents according to the present invention includes acquiring program information for the broadcast contents; extracting keywords from the program information; counting the extracted keywords to obtain a keyword count; preserving the keyword count; computing a difference value between a prior preserved keyword count and a current keyword count; extracting a predetermined keyword from the program information based on the difference value; and searching program information including the extracted predetermined keyword.

A recording medium recorded with a program according to the present invention makes a computer execute a process for searching broadcast contents, the process including acquiring program information for the broadcast contents; extracting keywords from the program information; counting the extracted keywords to obtain a keyword count; preserving the keyword count; computing a difference value between a prior preserved keyword count and a current keyword count; extracting a predetermined keyword from the program information based on the difference value; and searching program information including the extracted predetermined keyword.

In the present invention, program information for broadcast contents is acquired, keywords are extracted from the acquired program information and counted to obtain a keyword count, and the keyword count is preserved. Then a difference value between a prior preserved keyword count and a current keyword count is computed, a specified keyword is extracted based on the difference value, and program information including the extracted predetermined keyword is searched.

With the present invention, a keyword included in program information can be extracted. Especially, a popular keyword can be extracted based on a difference between the number of keywords included in program information for programs broadcast last week and the number of keywords included in program information for programs broadcast in the current week.

BRIEF DESCRIPTION OF THE DRAWINGS

FIG. 3 is a view showing an example of a keyword dictionary;

FIG. 4 is a view showing an example of an excluded keyword dictionary;

FIG. 5 is a view showing a keyword database file;

FIG. 6 is a view illustrating processing of counting a keyword;

FIG. 7 is a view showing a popular keyword database file;

FIG. 8 is a view showing an example of a screen for a popular program list;

FIG. 9 is a view showing an example of synonym dictionary;

DETAILED DESCRIPTION

Figure 1:
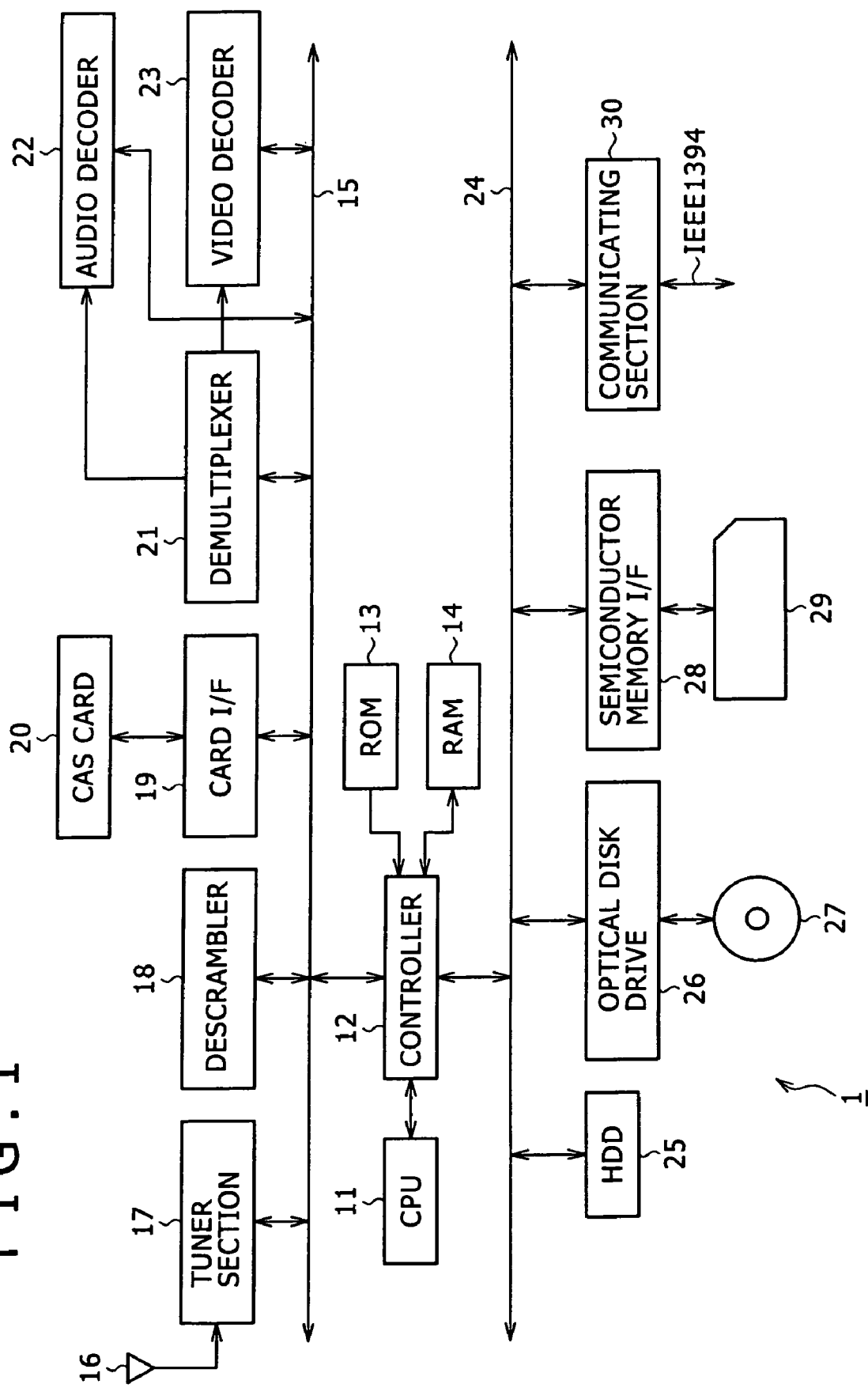
FIG. 1 is a block diagram showing an example of configuration of an information processing apparatus according to the present invention.

The best mode for carrying out the present invention is described below, and correspondence between the invention described in the specification and embodiments thereof is as described below. Even if an embodiment is generically described but not specifically described as one corresponding to any specific invention in this specification, it does not mean that the embodiment does not correspond to the invention. On the contrary, even if an embodiment is described as corresponding to any invention in the specification, it does not mean that the embodiment does not correspond to any other invention.

Further this description does not mean that the specification includes descriptions of all inventions each corresponding to any specific embodiment described in the specification. In other words, this description does not deny presence of other inventions which may be applied in a divisional application in the future, or which may appear or is added in amendment.

An information processing apparatus according to an embodiment of the present invention (such as an information processing apparatus 1 in FIG. 1) includes acquisition means (such as a program information receiving section 51 in FIG. 2 for executing the processing step S1 in FIG. 10) for acquiring program information concerning broadcast contents; first extracting means (such as a keyword extracting section 52 in FIG. 2 for executing the processing steps S11 to S16 in FIG. 11) for extracting keywords from the program information acquired by the acquisition means; counting means (such as a keyword counting section 55 in FIG. 2 for executing the processing steps S17 to S19 in FIG. 11) for counting keywords extracted by the first extracting means; preserving means (such as a keyword database 72 in FIG. 2) for preserving a result of counting by the counting means; a computing means (such as a difference value computing section 56 in FIG. 2 for executing the processing steps S51 to S60 in FIG. 13) for computing a difference between a result of counting of keywords in the past preserved in the preserving means and a result of counting of keywords performed last; second extracting means for (such as a popular keyword extracting section 57 in FIG. 2 for executing the processing steps S62 to S68 in FIG. 13) extracting a predetermined keyword based on a result of counting by the counting means; and searching means (such as a program information searching section 60 in FIG. 2 for executing the processing step S87 in FIG. 14) for searching program information including the predetermined keyword extracted by the second extracting means.

The information processing apparatus according to an embodiment of the present invention further includes excluding means (such as a keyword extracting section 52 in FIG. 2 for executing the processing step S14 in FIG. 11) for excluding program information in a predetermined category among the program information acquired by the acquisition means.

The information processing apparatus according to an embodiment of the present invention further includes excluding means (such as a keyword extracting section 52 in FIG. 2 for executing the processing step S15 in FIG. 11) for excluding program information with the program length shorter than a threshold value among the program information acquired by the acquisition means.

Figure 2:
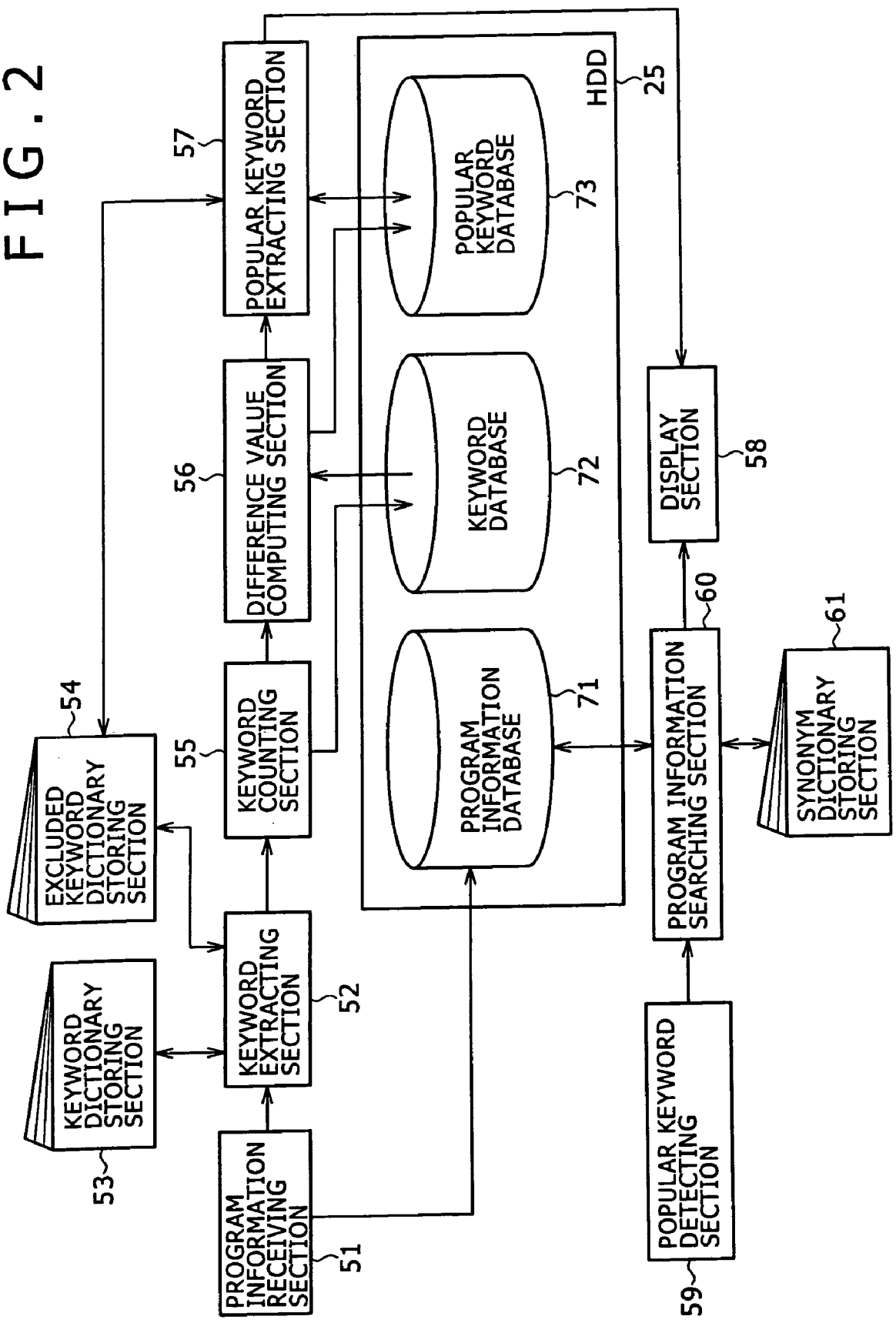
FIG. 2 is a block diagram showing an example of functional configuration of the information processing apparatus.

The information processing apparatus according to an embodiment of the present invention further includes storage means (such as an excluded keyword dictionary storing section 54 in FIG. 2) for storing keywords to be excluded; and excluding means (such as a popular keyword extracting section 57 in FIG. 2 for executing the processing step S66 in FIG. 13) for excluding the excluded keywords stored in the storage means among the keywords extracted by the second extracting means.

The information processing apparatus according to an embodiment of the present invention further includes storage means (such as a synonym dictionary storing section 61 in FIG. 2) for storing synonyms of keywords, so that the searching section can further search program information including synonyms corresponding to a predetermined keyword extracted by the second extracting section and stored in the storage means.

The information processing apparatus according to an embodiment of the present invention further includes determining means (such as a popular keyword extracting section 57 in FIG. 2 for executing the processing step S65 in FIG. 13) for determining whether a keyword count in the past has surpassed a predetermined threshold value or not, so that, when it is determined by the determining section that a count of keywords extracted in the past has surpassed the predetermined threshold value, the second extracting means does not extract any keyword.

The information processing apparatus according to an embodiment of the present invention further includes display control means (such as a display section 58 in FIG. 2 for executing the processing step S82 in FIG. 14) for controlling display of the program information searched by the searching means.

An information processing method according to an embodiment of the present invention includes a acquiring step (such as the step S1 in FIG. 10) of acquiring program information for broadcast contents; a first extracting step (such as the steps S11 to S16 in FIG. 11) of extracting keywords from program information acquired by processing in the acquiring step; a counting step (such as the steps S17 to S19 shown in FIG. 11) of counting keywords extracted by processing in the first extracting step; a preserving step (such as the step S21 in FIG. 11) of preserving a result of counting by processing in the counting step; a computing step (such as the steps S51 to S60 in FIG. 13) of computing a difference between a result of keyword count in the past preserved as a result of processing in the preserving step and a current keyword count; a second extracting step (such as the steps S62 to S68 in FIG. 13) of extracting a predetermined keyword based on a result of computing by processing in the computing step; and a searching step (such as the step S87 in FIG. 14) of searching program information including the predetermined keyword extracted by processing in the second extracting step.

Also in a program according to an embodiment of the present invention, the embodiments corresponding to the steps described above are the same as those of the information processing method according to an embodiment of the present invention.

Embodiments of the present invention are described hereinafter with reference to related drawings.

FIG. 1 is a block diagram showing an example of configuration of an information processing apparatus 1 according to the present invention.

A CPU (Central Processing Unit) 11 executes a program stored in a ROM (Read Only Memory) 13 or a program loaded from an HDD (Hard Disk Drive) 25 to a RAM (Random Access Memory) 14, and also controls operations of components connected to a bus 15 and a bus 24.

A tuner section 17 receives a broadcast signal from an antenna 16 according to controls by the CPU 11, decodes the signal, and outputs a transport stream broadcasted through a predetermined channel via the bus 15 to a descrambler 18. Program information concerning programs to be broadcasted (such as EPG (Electronic Program Guide)) is multiplexed to the received broadcast signal.

The descrambler 18 generates a key for descrambling by using data stored in a CAS card 20 inserted into a card I/F (Interface) 19, and descrambles the transport stream supplied from the tuner section 17. The transport stream descrambled by the descrambler 18 is supplied, for instance, via the bus 15 to the demultiplexer 21.

The card I/F 19 supplies the data read out from the CAS card 20 via the bus 15 to the descrambler 18.

The demultiplexer 21 extracts a predetermined stream from the transport stream supplied from the descrambler 18 according to controls by the CPU 11, and outputs packets constituting the extracted stream onto the bus 15, or to an audio decoder 22 and a video decoder 23. The contents including the packets obtained by the demultiplexer 21 are supplied, for instance, via the bus 15, a controller 12, and the bus 24 to the HDD 25 and are recorded therein.

The demultiplexer 21 outputs the program information extracted from the transport stream via the bus 15 and controller 12 to the CPU 11.

The audio decoder 22 decodes audio data (audio packets) supplied from the demultiplexer 21 and outputs the obtained audio data from an audio output terminal not shown. The audio data output from the audio output terminal is received, for instance, by a television receiver connected to the information processing apparatus 1, and voice and sounds corresponding to the audio data are output from a speaker of the television receiver.

The video decoder 23 decodes the video data (video packets) supplied from the demultiplexer 21 and outputs the obtained video data from a video output terminal not shown. The video data output from the video output terminal is received, for instance, by a television receiver connected to the information processing apparatus 1, and images corresponding to the video data are displayed on a display of the television receiver.

The video decoder 23 also has the OSD (On Screen Display) function for having a list of titles of contents recorded in the HDD 25 or popular programs extracted from the program information displayed thereon, and also outputs the video data generated by the OSD function via a video output terminal to the television receiver. Details of the processing of extracting popular programs from program information are described hereinafter.

The HDD 25 records therein the contents and program information supplied via the bus 24. The contents recorded in the HDD 25 is read out and reproduced according to the necessity according to controls by the CPU 11.

The optical disk drive 26 records the data supplied thereto via the bus 24 on an optical disk 27 by driving the optical disk 27 set therein, and further read out the data (including a program) recorded in the optical disk 27 and outputs the data to the bus 24. For instance, the optical disk drive 26 has the contents supplied via the bus 24 from the HDD 25 recorded in the optical disk 27, or reads out the contents recorded in the optical disk 27 via the bus 24, and has the contents recorded in the HDD 25. Herein the optical disk 27 is, for instance, a DVD (Digital Versatile Disk) or a Blu-ray Disk (trademark).

The semiconductor memory I/F 28 records the data supplied thereto via the bus 24 in the semiconductor memory 29 by driving a semiconductor memory 29 set therein, and further reads out data stored in the semiconductor memory 29 and outputs the data to the bus 24. The semiconductor memory 29 is, for instance, Memory Stick (Trademark of Sony Corporation), or SD Card (trademark).

A communicating section 30 communicates with external equipment connected thereto via, for instance, an IEEE (Institute of Electrical and Electronics Engineers) 1394 cable, and outputs the contents supplied thereto via, for instance, the bus 24 to the external equipment.

FIG. 2 is a block diagram showing an example of functional configuration of the information processing apparatus 1. The functional configuration shown in FIG. 2 is realized when the CPU 11 executes a predetermined program stored in the ROM 13.

A program information receiving section 51 receives the program information extracted by the demultiplexer 21 from a transport stream, supplies the program information to a keyword extracting section 52, also supplies the program information to a keyword extracting section 52, further supplies the program information to a program information database 71 in the HDD 25, and stores the program information therein. It is to be noted that, when program information is received, program information relating to the programs for eight days from the receiving data can be acquired.

The keyword extracting section 52 extracts keywords from the program information supplied from the program information receiving section 51 based on a keyword dictionary stored in a keyword dictionary storing section 53 as well as on an excluded keyword dictionary stored in an excluded keyword dictionary section 54.

The keyword dictionary storing section 53 stores, as a keyword dictionary, keywords such as personal names constituted by a plurality of character types (for instance, Chinese characters, Hiragana characters, Katakana characters), keywords constituted by Hiragana characters only, and keywords constituted by six or more characters.

FIG. 3 is a view showing an example of a keyword dictionary stored in the keyword dictionary storing section 53. In a case of the example shown in FIG. 3, information on personal names such as "KAMIJO Atomu", "Kaga Maiko", "Kato Aki", . . . is stored therein.

The excluded keyword dictionary storing section 53 stores, as an excluded keyword dictionary, keywords to be excluded as keywords (namely, words likely to be extracted generically).

FIG. 4 is a view showing an example of an excluded keyword dictionary stored in the excluded keyword dictionary storing section 54. In a case of the example shown in FIG. 4, information data such as "meter", "member", "drama", . . . is stored therein.

Herein, descriptions are provided below assuming a case of extracting keywords from the program information of, for instance, "variety, new championship for the king of picky eaters, Kato Aki vs Yakumaru Hirohide, new features giving you a belly laugh introduced one after another, talk of explosive laughter".

When the keyword extracting section 52 does not refer to the keyword dictionary stored in the keyword dictionary storing section 53 and the excluded keyword dictionary stored in the excluded keyword dictionary storing section 54, the keyword extracting section 52 extracts the keywords "variety", "Kato", "Aki", "Yakumaru Hirohide", "belly laugh", "feature" and "talk". On the other hand, when the keyword extracting section 52 refers to the keyword dictionary stored in the keyword dictionary storing section 53 and the excluded keyword dictionary stored in the excluded keyword dictionary storing section 54, the keyword extracting section 52 can extract the keyword "Kato Aki", which is a personal name constituted by Chinese characters and Hiragana characters, but does not extract the keyword "variety", which is a word likely to be extracted generically.

The keyword counting section 55 counts the number of keywords extracted by the keyword extracting section 52 for a period of a week, outputs the result of counting to the keyword database file, and makes the keyword database 72 in the HDD 25 store the same therein.

FIG. 5 is a view showing a keyword database file stored in the keyword database 72. The keyword database 72 includes keywords, and the same number of fields as the keywords.

In a case of the example shown in FIG. 5, in a field in the first line is stored information data having "Iraq" as keyword and "3" as the number of the keyword; in a field in the second line is stored information data having "marathon" as keyword and "13" as the number of the keyword; and in a field in the third line is stored information data having "Wentz Eiji" as keyword and "1" as the number of the keyword. Similarly, in a field in and after the fourth line is stored information data having a keyword and the number of the keyword.

The difference value computing section 56 refers to the result of counting of the keywords stored in the keyword database 72 for a period of a week, and computes a difference between the counting of the keywords for current week extracted today and that of the keywords for last week having been extracted a week ago.

Namely, as shown in FIG. 6, the difference value computing section 56 extracts keywords for current week (July 8 to 14) from the program information acquired today (July 8), and computes a difference between the result of the counting described above and that for last week (July 1 to 7) having been extracted a week ago (July 1). It is to be noted that the keywords are herein counted week by week, however, the case is one example, and it is naturally possible to discretionally change the period of counting.

The difference value computing section 56 then counts a difference between the number of keywords for current week and that for last week, outputs the result of counting to a popular keyword database file, and makes the keyword database 73 in the HDD 25 store the same therein.

FIG. 7 is a view showing a popular keyword database file stored in the keyword database 73. The popular keyword database 73 includes fields having keywords, the number of the keywords for current week, the number of the keywords for last week, and a difference between the number of the keywords for current week and that for last week.

In a case of the example shown in FIG. 7, in a field in the first line is stored information data having "Athens" as keyword, "18" as the number of the keyword for current week, "4" as the number of the keyword for last week, and "14" as a difference between the two numbers of the keyword; in a field in the second line is stored information data having "marathon" as keyword, "13" as the number of the keyword for current week, "2" as the number of the keyword for last week, and "11" as a difference between the two numbers of the keyword; and in a field in the third line is stored information data having "Tom-tom" as keyword, "10" as the number of the keyword for current week, "0" as the number of the keyword for last week, and "10" as a difference between the two numbers of the keyword. Similarly, in a field in and after the fourth line is also stored information data having a keyword, the number of the keyword for current week, the number of the keyword for last week, and a difference between the two numbers of the keyword.

The popular keyword extracting section 57 excludes, among the keywords in the popular keyword database file stored in the popular keyword database 73, character strings included in the excluded keyword dictionary stored in the excluded keyword dictionary storing section 54, then extracts a predetermined number (for instance, 20) of keywords in descending order of a difference between the number of keywords for current week and that for last week, and regards the keywords as popular keywords for current week. Further, the popular keyword extracting section 57 deletes a popular keyword database file stored in the popular keyword database 73 a predetermined period of time ago (for instance, ten days ago or more).

The display section 58 makes an external display display thereon a screen of a list of popular programs, based on the popular keywords extracted by the popular keyword extracting section 57 using OSD function of the video decoder 23. A user can select a program involving the popular keywords from the screen.

FIG. 8 is a view showing an example of a screen of a list of popular programs.

As shown in FIG. 8, a screen 81 displays popular keywords in a popular keyword display area 82, and also shows a list of popular programs involving popular keywords in a related program display area 84. In the state where the screen 81 described above is displayed, for instance, when a user moves a cursor using a button on a remote controller not shown and selects a popular keyword 83, programs involving the popular keyword is searched to display the programs in the form of a list in the related program display area 84. Additionally, when a user moves a cursor and selects a related program 85, detailed information, representative images and the like are displayed. Further, when a user presses down a decision button on a remote controller, a reservation for storing the related program 85 now being selected on video tape or the like is carried out.

The popular keyword detecting section 59 detects, among popular keywords displayed in the popular keyword display area 82 on the screen 81 shown in FIG. 8, a predetermined popular keyword selected in response to the operations by a user. A program information searching section 60 searches program information involving the popular keywords detected by the popular keyword detecting section 59 from a program information database 71 in the HDD 25, based on a synonym dictionary stored in the synonym dictionary storing section 61 and outputs the searching result on the display section 58. With this operation, the display section 58 updates a display for the screen 81 shown in FIG. 8, based on the searched program information.

FIG. 9 is a view showing an example of a synonym dictionary stored in the synonym dictionary storing section 61. In a case of the example shown in FIG. 9, information data including "personal name, his/her nickname" such as "Goto Kumi, Gokumi", "Goto Maki, Gomaki", "Tanano Naoko, Q-chan" is stored therein.

When a popular keyword corresponds to a first keyword in the synonym dictionary stored in the synonym dictionary storing section 61 (namely, the first keyword in each of the lines in the synonym dictionary ("Goto Kumi", "Goto Maki", "Tanano Naoko" and the like in the example shown in FIG. 9)), the program information searching section 60 also searches program information including the second keywords and on (namely, "Gokumi", "Gomaki", "Q-chan" and the like in the example shown in FIG. 9).

Figure 10:
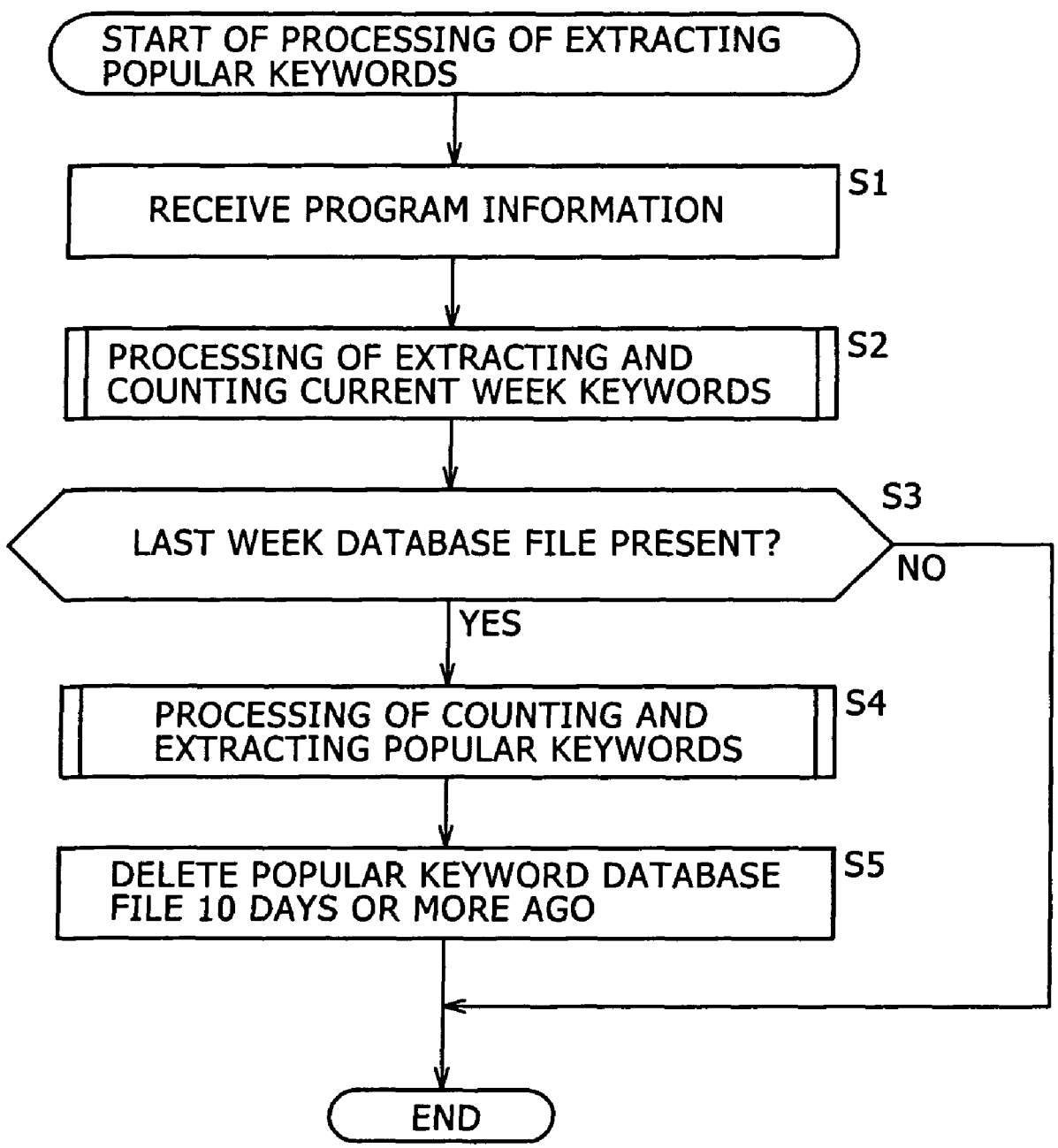
FIG. 10 is a flow chart illustrating processing of extracting popular keywords.

With this operation, popular keywords and related programs including synonyms of the popular keywords are searched and displayed in the related program display area 84 on the screen 81, Next, descriptions are provided for processing of extracting popular keywords executed by the information processing apparatus 1 with reference to a flow chart in FIG. 10. The processing is performed, for instance, when program information is extracted from a transport stream by the demultiplexer 21.

In step S1, the program information receiving section 51 receives program information extracted by the demultiplexer 21. With this operation, program information for a period of about eight days counting from the day when the information is received.

In step S2, the keyword extracting section 52 extracts keywords for current week among the program information received with processing in step S1, and the keyword counting section 55 counts the number of keywords extracted current week. Though more detailed descriptions are provided later for this processing of extracting and counting the keywords for current week with reference to a flow chart in FIG. 11, with this processing, a keyword database file as a result of counting keywords for a period of a week is stored in the keyword database 72.

In step S3, the difference value computing section 56 determines whether there is a keyword database file for last week in the keyword database 72 or not (namely, with processing in step S2, a keyword database file as a result of counting keywords for last week is stored or not), and when the difference value computing section 56 determines that there is a keyword database file, the processing flows to step S4.

In step S4, the difference value computing section 56 counts a difference between the result of counting keywords for current week and that for last week, and the popular keyword extracting section 57 extracts a predetermined number of popular keywords in descending order of the difference between the numbers of keywords for current week and for last week. Though more detailed descriptions are provided later for this processing of counting and extracting the popular keywords with reference to the flow chart shown in FIG. 13, with this processing, a difference between the numbers of keywords for current week and for last week is counted, a popular keyword database file as the result of the counting is stored in the popular keyword database 73, and the popular keywords for current week are extracted.

In step S5, the popular keyword extracting section 57 deletes a popular keyword database file stored in the popular keyword database 73 ten days ago or more, and thus the processing of extracting popular keywords is terminated.

On the other hand, when it is determined in step S3 that there is not a keyword database file for last week in the keyword database 72, the processing in step S4 and step S5 is skipped to terminate the processing. Namely, when there is not yet a keyword database file for last week in the keyword database 72, a difference between the keyword database file for last week and that for current week cannot be counted, so that the popular keywords for current week are not extracted.

With the processing of extracting popular keywords described above, a difference between the number of keywords for current week and that for last week in the keywords extracted from program information is counted, and the popular keywords for current week are extracted from the result of the counting.

Figure 11:
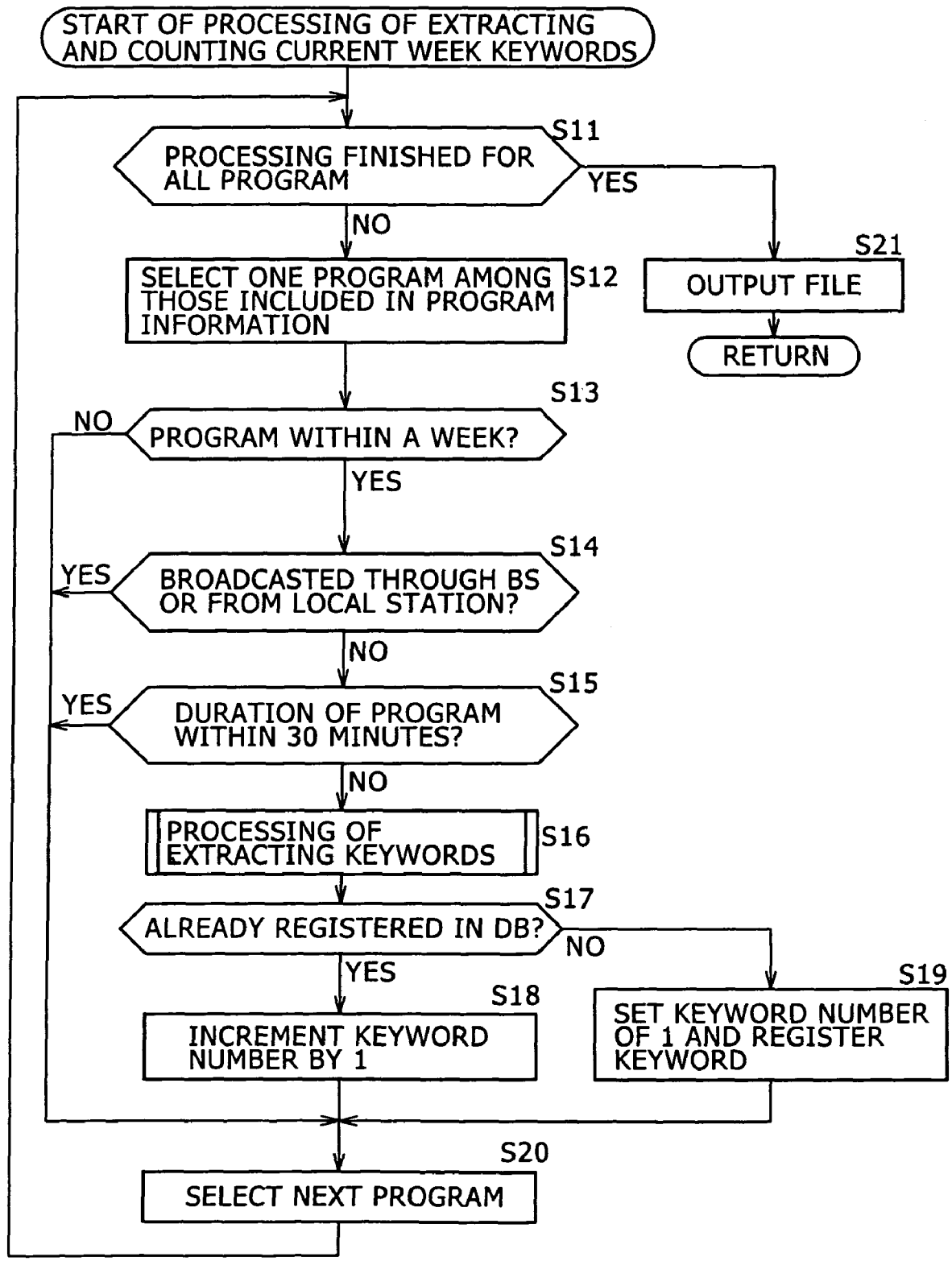
FIG. 11 is a flow chart illustrating in detail the processing of extracting and counting keywords current week in step S2 shown in FIG. 10.

Next, detailed descriptions are provided for the processing of extracting and counting current week keywords in step S2 in FIG. 10 with reference to FIG. 11.

In step S11, the keyword extracting section 52 determines whether the processing of extracting and counting keywords for all programs has been finished or not. When it is determined in step S11 that the processing of extracting and counting keywords for all programs has not been finished, the processing flows to step S12.

In step S12, the keyword extracting section 52 selects one of the program information received in the processing in step S1 in FIG. 10. In step S13, the keyword extracting section 52 determines whether the programs selected in the processing in step S12 are to be broadcasted within a week or not, and when it is determined in step S13 that the programs are to be broadcasted within a week, the processing flows to step S14.

In step S14, the keyword extracting section 52 further determines whether the selected programs are those broadcasted through a satellite broadcasting system or from a local broadcasting station or not, and when it is determined in step S14 that the selected programs are not those broadcasted through a satellite broadcasting system nor from a local broadcasting station, the processing flows to step S15. In step S15, further the keyword extracting section 52 determines that duration of each of the selected programs is within 30 minutes or not. When it is determined in step S15 that duration of each of the selected programs is not within 30 minutes, the processing flows to step S16. In other words, with the processing steps S14 and S15, filtering is performed to exclude keywords which will not become popular ones.

In step S16, the keyword extracting section 52 extracts keywords from the program information for programs determined as those to be broadcasted within a week, not broadcasted from the satellite broadcasting system nor from any local broadcasting station, and having the duration of not less than 30 minutes.

Figure 12:
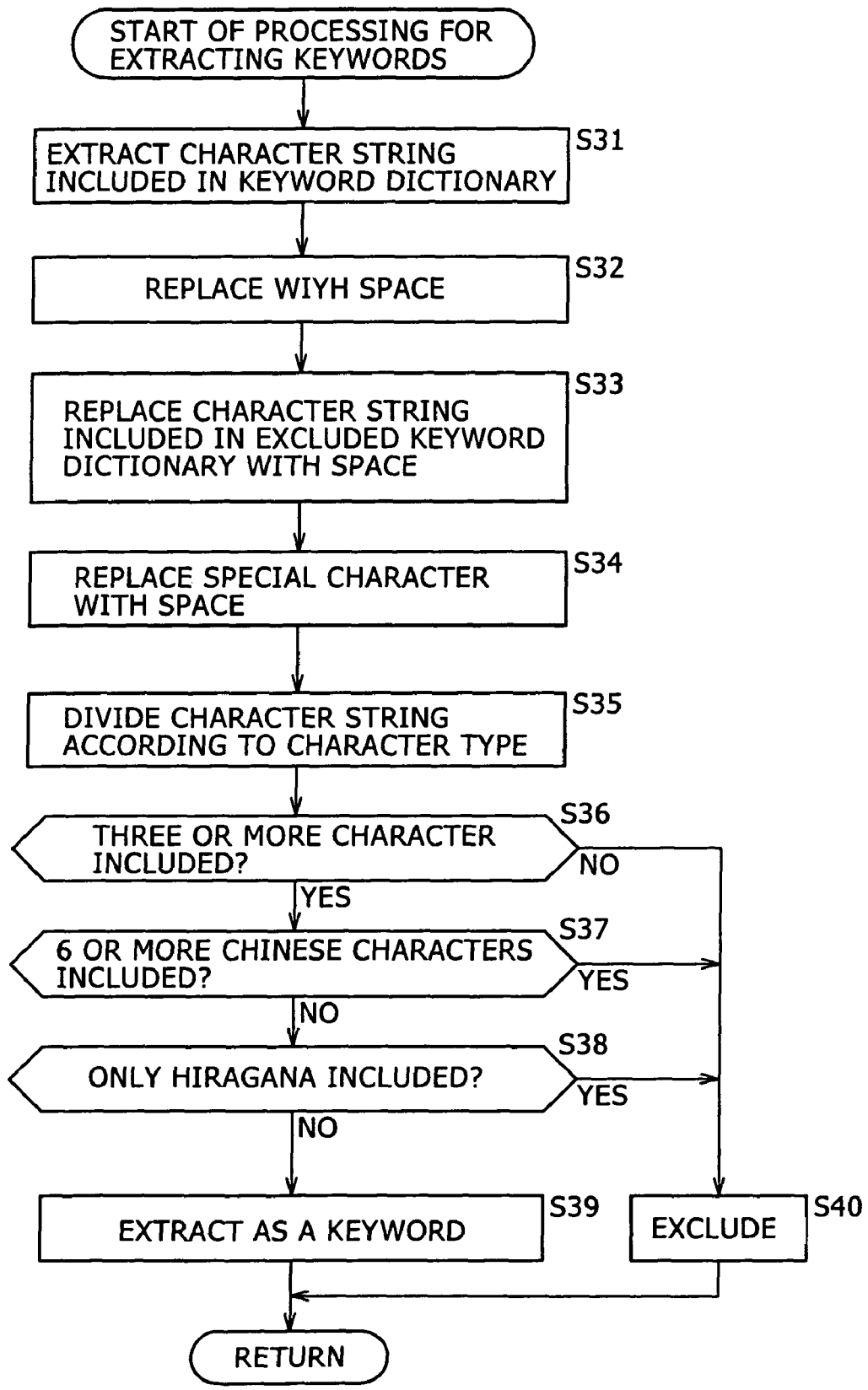
FIG. 12 is a flow chart illustrating in detail the processing of extracting keywords in step S16 in FIG. 11.

Details of the processing of extracting keywords in step S16 in FIG. 11 are described below with reference to a flowchart shown in FIG. 12.

In step S31, the keyword extracting section 52 extracts character strings included in the keyword dictionary (FIG. 3) stored in the keyword dictionary storing section 53 (See FIG. 3) from the object character strings in program information for the programs determined as those to be broadcasted within a week, not broadcasted from the satellite broadcasting system nor from any local broadcasting station, and having the duration of not less than 30 minutes (namely detailed information) and replaces portions corresponding to the extracted character strings respectively with spaces in step S32.

In step S33, the keyword extracting section 52 replaces the character strings included in the excluded keyword dictionary (FIG. 4) stored in the excluded keyword dictionary storing section 54 with spaces respectively. In step S34, the keyword extracting section 52 replaces special characters in the object character strings with spaces. In step S35, the keyword extracting section 52 separates each of the object character strings by dividing each character string with the character type of Chinese character, Hiragana, Katakana, numerals, alphabets, signs and the like.

In step S36, the keyword extracting section 52 determines whether each of the character strings separated in the processing step S35 include three or more characters. When it is determined in step S36 that the separated character string includes three or more characters, the processing flows to step S37.

In step S37, the keyword extracting section 52 further determines whether the character string separated in the processing step S35 includes six or more Chinese characters or not. When it is determined in Step 37 that the separated character string does not include six or more Chinese characters, the processing flows to step S38.

In step S38, the keyword extracting section 52 further determines whether the character string separated in step S35 includes only Hiragana or not. When it is determined in step S38 that the separated character string includes characters other than Hiragana, the processing flows to step S39.

In step S39, the keyword extracting section 52 extracts the character strings as those having three or more characters but not including six or more Chinese characters, and also including characters other than Hiragana as keywords.

More specifically, for instance, when detailed information for program information for "Zoom-in SUPER" is "Real intention of Chief Managing Director * is "as expressed in the press interview by * Bank; latest image of Harry Potter; explosive laughter and butting-in project—articles not returned to the owner; talked-about multifunctional bathroom scale; Ruritou of Nanzen-ji in Kyoto; Hashimoto Goro", "Chief Managing Director *", "* Bank", "Harry Potter", "Nanzen-ji in Kyoto", "Ruritou" and "Hashimoto Goro" are selected as keywords.

On the other hand, when it is determined in step S36 that the character string separated according to a character type does not include three or more characters, or when it is determined in step S37 that the character string separated according to a character type includes six or more characters, or further when it is determined in step S38 that the character string separated according to a character type includes only Hiragana, the processing flows to step S40, and the keyword extracting section 52 excludes the character string.

More specifically, for instance, when the detailed information is as described above, such character strings as "explosive laughter", "talked-about", and "multifunctional bathroom scale" are excluded.

After the processing in step S39 or step S40 is carried out, the processing returns to step S17 shown in FIG. 11.

In step S17, the keyword counting section 55 determines whether the keywords extracted in the keyword extracting processing in step S16 have been registered in the keyword database 72 or not. When it is determined that the extracted keywords have been registered in the keyword database 72, the processing flows to step S18.

In step S18, the keyword counting section 55 increments a value for a field of the number of keywords for the one just extracted by one.

When it is determined in step S17 that the keywords extracted in the keyword extracting processing in step S16 have not been registered in the keyword database 72 yet, the processing flows to step S19, and the keyword counting section 55 sets the number of keyword to 1, and also registers the keywords just extracted in the keyword database 72.

After the processing in step S18 or step S19 is carried out, when it is determined in step S13 that the programs currently on selection are not to be broadcasted within one week, or when it is determined in step S14 that the programs currently on selection are broadcasted from a satellite broadcasting system or from any local broadcasting station, or when it is determined in step S15 that direction of each of the programs currently on selection is within 30 minutes, the processing flows to step S20, and the keyword extracting section 52 selected the next program, then returns to step S11, and executes the processing sequence described above again.

In step S11, When it is determined that the processing of extracting and counting keywords for all programs, the processing flows to step S21, and the keyword counting section 55 outputs a result of keyword counting for one week extracted keywords to a keyword database file and has the keywords recorded in the keyword database 72.

With the processing of extracting and counting keywords for the current week, the keyword database file including a result of keyword counting for one week is recorded in the keyword database 72 (Refer to FIG. 5).

Figure 13:
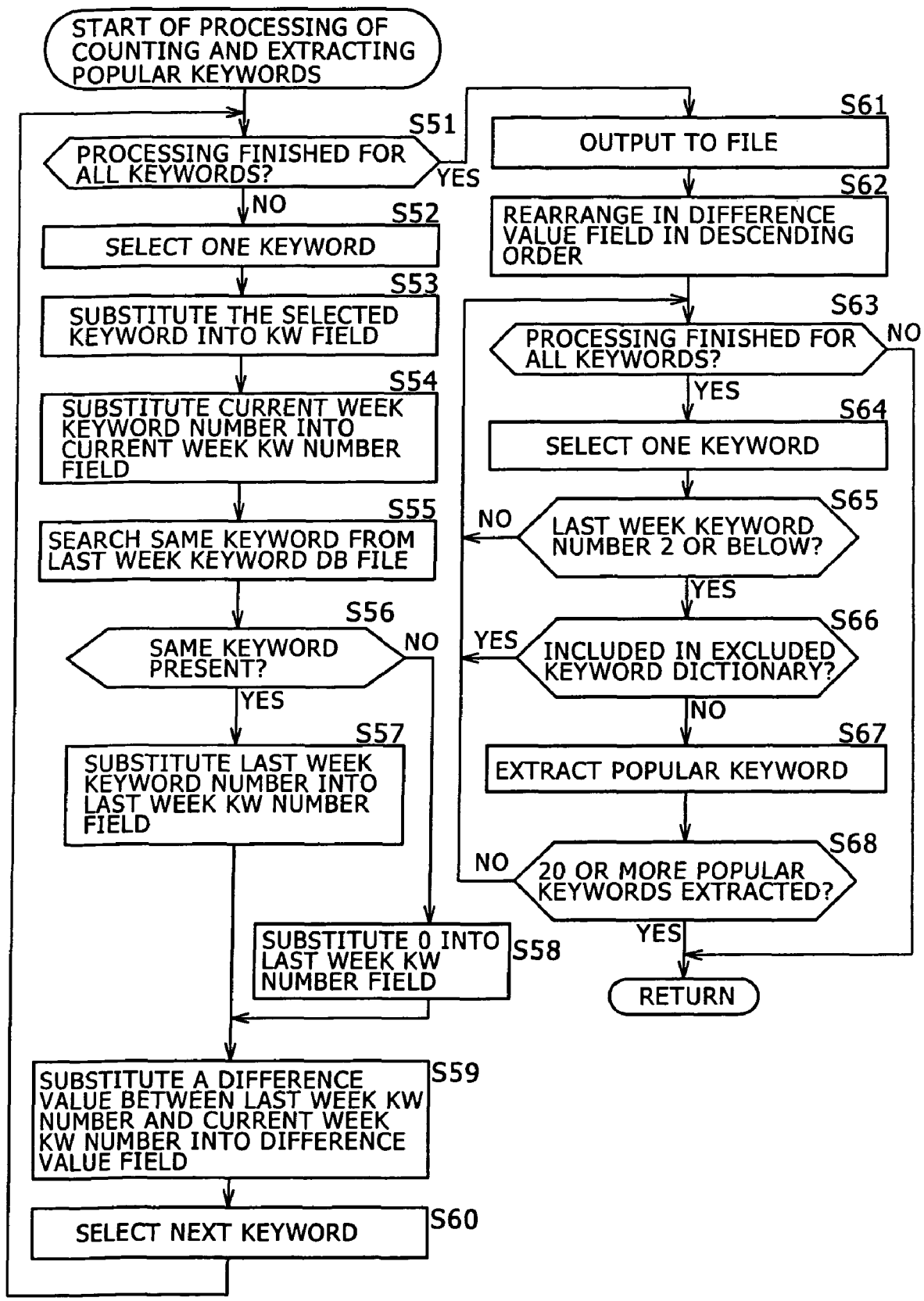
FIG. 13 is a flow chart illustrating in detail the processing of counting and extracting popular keywords in step S4 in FIG. 10.

Next, details of the processing of counting and extracting popular keywords in step S4 in FIG. 10 is described with reference to FIG. 13.

In step S51, the difference value computing section 56 determines whether the processing of counting all keywords has been finished or not. When it is determined in step S51 that the processing of counting all keywords has not been finished, the processing flows to step S52.

In step S52, the difference value computing section 56 selects one keyword from those for a current week extracted in the processing in step S2 in FIG. 10. In step S53, the difference value computing section 56 substitutes the keyword selected in the processing in step S52 into the keyword field (KW field) in the popular keyword database file. With this operation, for instance, as shown in FIG. 7, the keyword currently on selection is substituted into the keyword field (the first column field from the left) of the popular keyword database file.

In step S54, the difference value computing section 56 reads out the keyword database file for a current week recorded in the keyword database 72, fetches a number of keywords currently on selection, and substitutes the number into the keyword number field in the popular keyword database file. With this operation, for instance, as shown in FIG. 7, the number of keywords for a current week currently on selection is substituted into the current week keyword number field (a second column field from the left) in the popular keyword database file.

In step S55, the difference value computing section 56 reads out the keyword database file for a last week recorded in the keyword database 72, and searches the same keywords as those currently on selection. In step S56, the difference value computing section 56 determines based on a result of searching processing in step S55 whether the same keywords as those currently on selection are present in the keyword database file for last week or not. When it is determined in step S56 that the same keywords are present, the processing flows to step S57.

In step S57, the difference value computing section 56 substitutes the number of keywords currently on selection searched and acquired from the last week keyword database file into a last week keyword number field in the popular keyword database file. With this operation, for instance, as shown in FIG. 7, the number of last week keywords currently on selection is substituted into the last week keyword number field (third column field from the left) in the popular keyword database file.

In step S56, when it is determined that the same keywords as those currently on selection are not present in the last week keyword database file, the processing flows to step S58, and the difference value computing section 56 substitutes 0 (zero) into the last week keyword number field in the popular keyword database file.

After the processing in step S57 or step S58 is carried out, in step S59, the difference value computing section 56 counts a difference between the number of keywords for the current week and the number of those for the last week, and substitutes a result of counting into a different keyword number field in the popular keyword database file. With this operation, for instance, as shown in FIG. 7, a difference between the number of keywords for the current week currently on selection and the number of keywords for the last week currently on selection is substituted into a difference field (a fourth column field from the left) in the popular keyword database file.

In step S60, the difference value computing section 56 selects the next keyword, then returns to step S51, and executes the processing sequence described above again. In step S51, when it is determined that the processing of counting all keywords has been finished, the processing flows to step S61, and the difference value computing section 56 outputs a result of counting of extracted keywords for one week to the popular keyword database file to have the data recorded in the popular keyword database 73.

In step S62, the popular keyword extracting section 57 rearranges difference values in the descending order by referring to the difference value field in the popular keyword database file recorded in the popular keyword data 73.

In step S63, the popular keyword extracting section 57 determines whether the processing has been executed to all keywords or not. When it is determined that the processing has not been finished for all of the keywords yet, the processing flows to step S64. In step S64, the popular keyword extracting section 57 selects one keyword having a large value from the keywords rearranged in the descending order of the values in the difference value field in the processing in step S62.

In step S65, the popular keyword extracting section 57 determines whether the number of keywords for the last week selected in the processing in step S64 is not more than two or not. When it is determined that the number of keywords for the last week selected in the processing in step S64 is not more than two, the processing flows to step S66. In step S66, the popular keyword extracting section 57 determines whether each of the keywords currently on selection is a character string included in the excluded keyword dictionary (Refer to FIG. 4) stored in the excluded keyword dictionary storing section 54 or not. When it is determined that the keyword is not included in the excluded keyword dictionary, the processing flows to step S67. In other words, with the processing steps S65 and S66, filtering is performed to exclude keywords which can never become popular ones.

In step S67, the popular keyword extracting section 57 extracts the keywords for the last week currently on selection each having a value of two or below and not included in the excluded keyword dictionary as popular keywords.

In step S68, the popular keyword extracting section 57 determines whether 20 or more popular keywords have been extracted or not. When it is determined that 20 or more popular keywords have not been extracted yet, the processing returns to step S63, and the popular keyword extracting section 57 executes the processing sequence described above again. Further when it is determined in step S65 that the number of keywords for the last week currently on selection is not equal to or less than two, or when it is determined in step S66 that any of the keywords currently on selection is included in the excluded keyword dictionary, the processing returns to step S63, and the processing sequence described above is executed again.

When it is determined in step S68 that 20 popular keywords have been extracted, or when it is determined in step S63 that the processing of all keywords has been finished, the processing of counting and extracting popular keywords is terminated.

With the processing of counting and extracting popular keywords, a popular keyword database file as a result of counting current week keywords is recorded in the popular keyword data 73 (Refer to FIG. 7), and also the current popular keywords are extracted.

Figure 14:
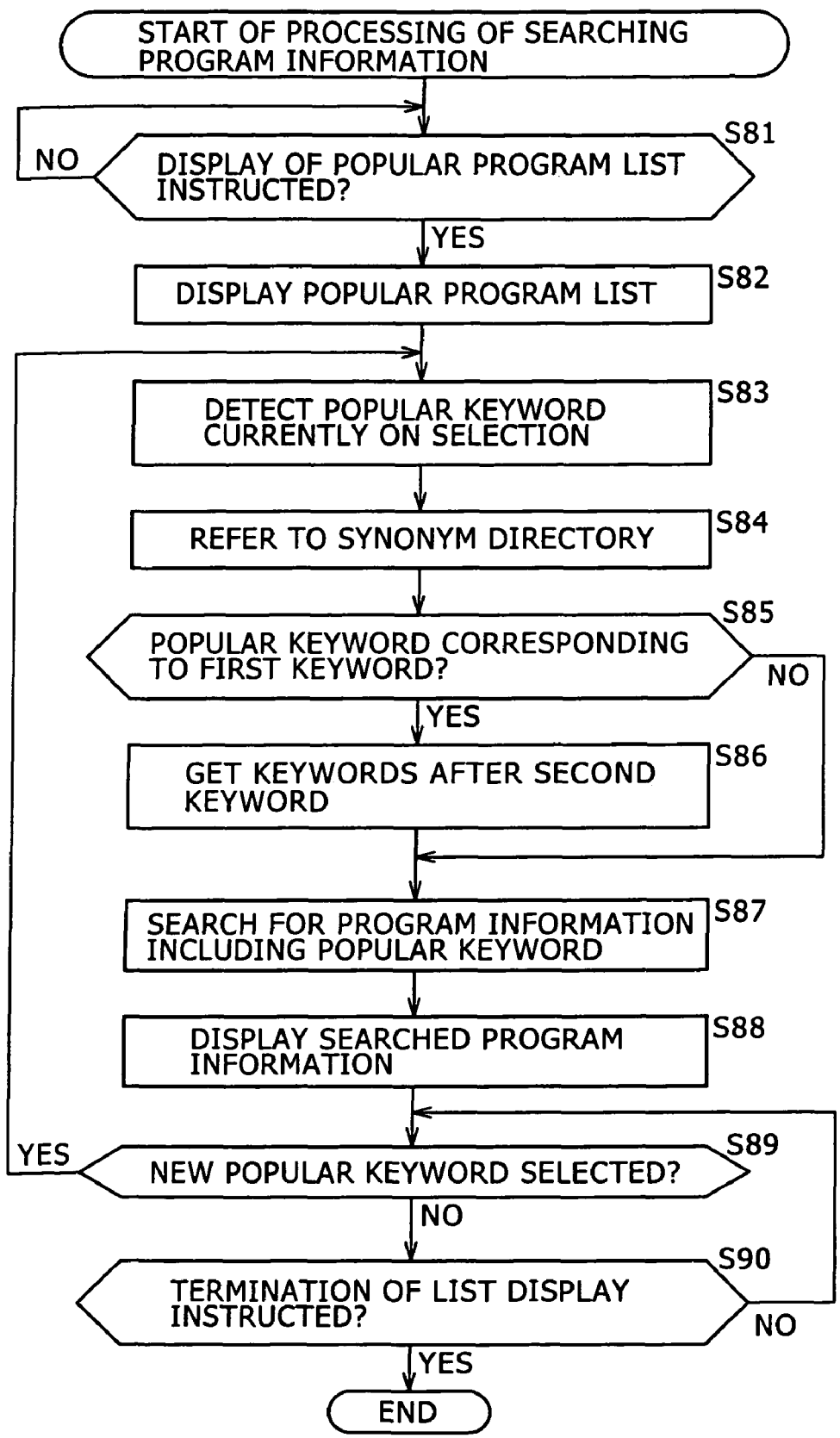
FIG. 14 is a flow chart illustrating the processing of searching program information.

Next descriptions are provided for the program information searching processing executed by the information processing system 1 with reference to the flowchart in FIG. 14.

In step S81, the CPU 11 determines whether display of a popular program list is instructed from a user or not, and waits for instruction for display of the popular program list. When display of the popular program list is instructed in step S81, the processing flows to step S82, and the display section 58 displays the popular program list on an external display based on the popular keywords extracted in the popular keyword extracting processing in FIG. 10 described above. With this operation, for instance, a screen 81 shown in FIG. 8 is displayed.

In step S83, a popular keyword detecting section 59 detects popular keywords currently on selection among the popular keywords displayed on a popular keyword display area 82 on the screen 81 shown in FIG. 8. In the case shown in FIG. 8, a popular keyword 83 "Iiya Chosuke" is detected.

In step S84, the program information searching section 60 refers to the synonym dictionary (Refer to FIG. 9) stored in the synonym dictionary storing section 61. In step S85, the program information searching section 60 determines whether the popular keyword extracted in the processing in step S83 corresponds to a first keyword in the synonym dictionary or not. When it is determined that the popular keyword corresponds to the first keyword in the synonym dictionary, the processing flows to step S86. In step S86, the program information searching section 60 fetches a second keyword and on in the synonym dictionary.

On the contrary, when it is determined in step S85 that the popular keyword currently on selection does not correspond to the first keyword in the synonym dictionary, the processing in step S86 is skipped.

In step S87, the program information searching section 60 searches program information including the popular keyword currently on selection from the program information database 71. In this step, also the program information including the second keyword and on in the popular keyword dictionary is searched. In step S88, the display section 58 has the program information searched in the processing in step S87 displayed on the program information list. With this operation, a list of the program relating to the popular keywords is displayed on a related program display area 84 on the screen 81 shown in FIG. 8. In the case shown in FIG. 8, also the related programs such as "Farewell to Mr. Iiya" (related program 85) and "In memory of Mr. Iiya" and the like including synonyms to the popular keyword 83 ("Iiya Chosuke") selected by a user are displayed.

In step S89, the popular keyword detecting section 59 determines whether any new one among the popular keywords displayed in the display area 82 on the screen 81 shown in FIG. 8 has been selected anew or not. When it is determined that any new popular keyword has been selected, the processing returns to step S83, and the processing sequence described above is executed again.

Further, in step S89, when a user presses the right-side button on a remote controller not shown, the cursor is moved to a program display area 84 in FIG. 8. Further the user can select a program relating to the popular keyword from those shown in the relating program display area 84 by pressing the up/down button, for instance, to make a subscription for recording of the selected program by pressing the decision button. Further the user can select a new popular keyword, namely returns the cursor to the popular keyword display area 82 by pressing the left-side button.

In step S89, when it is determined that any new popular keyword has not been selected, the processing flows to S90, and the CPU 11 determines whether termination of display of the popular program list has been instructed or not. When it is determined that termination of display of the popular program list has not been instructed, the processing sequence described above is executed again. Then in step S90, when termination of display of the popular program list is instructed by the user, the program information searching processing is terminated.

With the program information searching processing described above, program information relating to popular keywords is searched and displayed. When the last week keyword database file is not present in the keyword database 72 (step S3 in FIG. 10), a different value from the current week keyword database file can not be counted, so that any popular keyword is not extracted and keyword-related program information is not displayed.

With the present invention as described above, by counting a difference value between the number of current week keywords and the number of last week keyword included in the program information, it is possible to extract a popular keyword and also to search and display program information relating to the extracted popular keyword. Therefore, a user can easily fetch popular keywords presented by the information processing apparatus 1 and program information (popular programs) correlated to the popular keywords without the need for searching any popular keyword from newspapers, TV information magazines, or media making use of the Internet.

Descriptions above assume a case where difference values between the number of current week keywords and the number of last week keywords included in the program information are counted and keywords each having a large difference value are extracted as popular keywords. However, the present invention is not limited to this configuration, and also the configuration is allowable in which current week keywords each having a value showing substantial increase as compared to a value in the last week are extracted as popular keywords.

The processing sequence described above can be executed by hardware, but may be executed by software.

When the processing sequence is executed by software, the program constituting the software is installed from a network or a recording medium into a computer incorporated in dedicated hardware, or into a general-purpose computer which can execute various functions when various types of programs are installed therein.

As shown in FIG. 2, this recording medium may be not only an optical disk 27 or a package medium configured of a semiconductor memory 29 or the like which is distributed to the user independently from the apparatus for providing the program, but also a ROM 13 or a hard disk included in the HDD 25 in which the program is provided to the user in the state where the program is previously incorporated in the unit itself.

It is to be noted that the processing steps described in the specification are not always required to be executed chronologically according to the described sequence, and that the steps may be executed concurrently or discretely.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An information processing apparatus, comprising:
   means for acquiring program information for received contents;
   means for extracting keywords from the program information;
   means for counting the number of occurrences for each of the extracted keywords to obtain a keyword count for each of the extracted keywords;
   means for storing the keyword counts;
   means for computing respective difference values for each of the extracted keywords by subtracting a prior keyword count stored by the storing means from a current keyword count;
   means for extracting predetermined keywords from the program information based on the difference values;
   means for searching program information including the predetermined keywords extracted by the second extracting means; and
   control means for controlling a display unit to display a list of the program information uncovered by the searching means together with a list of the predetermined keywords extracted by the second extracting means,
   a user may select a displayed keyword to display a list of programs related to the selected keyword,
   each of the prior keyword counts is generated by counting occurrences of the corresponding keyword for a respective first predetermined period of time, and each of the current keyword counts is generated by counting occurrences of the corresponding keyword for a respective second predetermined period of time, such that each difference value represents a difference between the number of occurrences of a keyword during a second predetermined period of time and the number of occurrences of the keyword during a first predetermined period of time,
   the keywords extracted by the second extracting means excluding keywords included in an excluded keyword dictionary, and the keywords extracted by the second extracting means being a predetermined number of keywords determined according to the difference values as ranked in descending order, such that the rank of any keyword extracted by the second extracting means is higher than the rank of any keyword not extracted by the second extracting means.

2. The information processing apparatus according to claim 1, further comprising:
   means for excluding a predetermined category of the program information acquired by the acquisition means.

3. The information processing apparatus according to claim 1, further comprising:
   means for excluding from the program information acquired by the acquisition means program information for programs having a duration shorter than a predetermined threshold value.

4. The information processing apparatus according to claim 1, further comprising:
   means for storing excluded keywords; and
   means for excluding the excluded keywords stored in the storage means from among the keywords extracted by the second extracting means.

5. The information processing apparatus according to claim 1, further comprising:
   means for storing synonyms of the keywords,
   wherein the searching means further searches for program information including synonyms corresponding to the predetermined keyword stored in the storage means and extracted by the second extracting means.

6. The information processing apparatus according to claim 1, further comprising:
   means for determining whether the prior keyword count has surpassed a predetermined threshold value,
   wherein, when it is determined by the determining means that the prior keyword count has surpassed the predetermined threshold value, the second extracting means does not extract the predetermined keyword.

7. The information processing apparatus according to claim 1, further comprising:
   means for controlling the display of the program information searched by the searching means.

8. The information processing apparatus according to claim 1, wherein the first extracting means extracts the keywords from the program information for a period of one week from a date on which the program information is acquired by the acquisition means.

9. The information processing apparatus according to claim 1, wherein the first extracting means extracts the keywords from detailed information in the program information.

10. The information processing apparatus according to claim 1, wherein the first extracting means extracts the keywords from the program information for programs received through a predetermined channel.

11. The information processing apparatus according to claim 1, wherein the second extracting means extracts keywords based on the difference values such that for each of the keywords extracted by the second extracting means the respective difference values are greater than or equal to each of the difference values of the keywords not extracted by the second extracting means.

12. The information processing apparatus according to claim 1, wherein the second extracting means extracts keywords for which the keyword count is greater than or equal to a predetermined threshold.

13. A method for using a processor to search received contents, the method comprising the steps of:
   using a receiver to acquire program information for the received contents;
   extracting keywords from the program information using the processor;
   counting the number of occurrences for each of the extracted keywords to obtain a keyword count for each of the extracted keywords;
   storing the keyword counts in a memory;
   computing respective difference values for each of the extracted keywords by subtracting a prior keyword count stored in the storing step from a current keyword count;
   extracting predetermined keywords from the program information based on the difference values;
   searching program information including the predetermined keywords extracted in the second extracting step; and
   controlling a display unit to display a list of the program information uncovered in the step of searching together with a list of the predetermined keywords extracted in the step of extracting predetermined keywords, a
   user may select a displayed keyword to display a list of programs related to the selected keyword,
   each of the prior keyword counts is generated by counting occurrences of the corresponding keyword for a respective first predetermined period of time, and each of the current keyword counts is generated by counting occurrences of the corresponding keyword for a respective second predetermined period of time, such that each difference value represents a difference between the number of occurrences of a keyword during a second predetermined period of time and the number of occurrences of the keyword during a first predetermined period of time, the keywords extracted in the second extracting step excluding keywords included in an excluded keyword dictionary, and the keywords extracted in the second extracting step being a predetermined number of keywords determined according to the difference values as ranked in descending order, such that the rank of any keyword extracted in the second extracting step is higher than the rank of any keyword not extracted in the second extracting step.

14. A recording medium recorded with a program for making a, computer execute a process for searching received contents, the process comprising the steps of:

acquiring program information for the received contents;

extracting keywords from the program information;

counting the number of occurrences for each of the extracted keywords to obtain a keyword count for each of the extracted keywords;

storing the keyword counts;

computing respective difference values for each of the extracted keywords by subtracting a prior keyword count stored in the storing step from a current keyword count;

extracting predetermined keywords from the program information based on the difference values;

searching program information including the predetermined keywords extracted in the second extracting step; and controlling a display unit to display a list of the program information uncovered in the step of searching together with a list of the predetermined keywords extracted in the step of extracting predetermined keywords, a user may select a displayed keyword to display a list of programs related to the selected keyword, each of the prior keyword counts is generated by counting occurrences of the corresponding keyword for a respective first predetermined period of time, and each of the current keyword counts is generated by counting occurrences of the corresponding keyword for a respective second predetermined period of time, such that each difference value represents a difference between the number of occurrences of a keyword during a second predetermined period of time and the number of occurrences of the keyword during a first predetermined period of time, the keywords extracted in the second extracting step excluding keywords included in an excluded keyword dictionary, and the keywords extracted in the second extracting step being a predetermined number of keywords determined according to the difference values as ranked in descending order, such that the rank of any keyword extracted in the second extracting step is higher than the rank of any keyword not extracted in the second extracting step.

* * * * *